(12) United States Patent
Nagase

(10) Patent No.: US 8,240,425 B2
(45) Date of Patent: Aug. 14, 2012

(54) ELECTRIC POWER STEERING APPARATUS

(75) Inventor: Shigeki Nagase, Nabari (JP)

(73) Assignee: Jtekt Corporation, Osaka-shi (JP)

( * ) Notice: Subject to any disclaimer, the term of this patent is extended or adjusted under 35 U.S.C. 154(b) by 232 days.

(21) Appl. No.: 12/747,079

(22) PCT Filed: Nov. 20, 2008

(86) PCT No.: PCT/JP2008/071126
§ 371 (c)(1),
(2), (4) Date: Jun. 9, 2010

(87) PCT Pub. No.: WO2009/084342
PCT Pub. Date: Jul. 9, 2009

(65) Prior Publication Data
US 2010/0263960 A1   Oct. 21, 2010

(30) Foreign Application Priority Data

Dec. 27, 2007   (JP) ................................ 2007-336427

(51) Int. Cl.
*B62D 5/04* (2006.01)
(52) U.S. Cl. ......... 180/443; 318/479; 318/433; 318/504
(58) Field of Classification Search .................. 180/443; 318/479, 433, 504
See application file for complete search history.

(56) References Cited

U.S. PATENT DOCUMENTS

| | | | |
|---|---|---|---|
| 6,008,600 A | 12/1999 | Tomioka | |
| 2008/0167779 A1* | 7/2008 | Suzuki | 701/42 |
| 2009/0078493 A1* | 3/2009 | Nagase | 180/443 |

FOREIGN PATENT DOCUMENTS

| | | |
|---|---|---|
| JP | 10 136687 | 5/1998 |
| JP | 2003 244943 | 8/2003 |
| JP | 2003 320942 | 11/2003 |
| JP | 2004 135389 | 4/2004 |
| JP | 2005 261054 | 9/2005 |
| JP | 2005 261180 | 9/2005 |

(Continued)

OTHER PUBLICATIONS

U.S. Appl. No. 12/681,972, filed Apr. 7, 2010, Nagase.

(Continued)

*Primary Examiner* — Tashiana Adams
(74) *Attorney, Agent, or Firm* — Oblon, Spivak, McClelland, Maier & Neustadt, L.L.P.

(57) ABSTRACT

When a source consisting of series-connected battery 7 and auxiliary power supply 9 supplies an electric power to a motor 4, a MOS-FET 13 for preventing a current induced by a voltage of the auxiliary power supply 9 from being reversed upstream should be off if it operates normally. Therefore, voltages at the opposite terminals of the MOS-FET 13 should have a difference which corresponds to a voltage of the auxiliary power supply 9. Hence, the voltages at the opposite terminals of the MOS-FET 13 are detected by two voltage detectors 23 and 25 when the electric power from the auxiliary power supply 9 is supplied to the motor 4. If the potential difference between the voltages at the opposite terminals of the MOS-FET 13 is equal to or less than a predetermined value, a control circuit 24 issues a failure signal upon determination that the MOS-FET 13 suffers a short-circuit fault. A MOS-FET 15 is also monitored in the same way.

3 Claims, 4 Drawing Sheets

FOREIGN PATENT DOCUMENTS

| | | |
|---|---|---|
| JP | 2005 287222 | 10/2005 |
| JP | 2006 213273 | 8/2006 |
| JP | 2007 131075 | 5/2007 |
| JP | 2007 166792 | 6/2007 |
| WO | 2007 004357 | 1/2007 |

OTHER PUBLICATIONS

U.S. Appl. No. 12/738,954, filed Apr. 20, 2010, Nagase.
U.S. Appl. No. 12/747,024, filed Jun. 9, 2010, Nagase.

* cited by examiner

ELECTRIC POWER STEERING APPARATUS

TECHNICAL FIELD

The present invention relates to an electric power steering apparatus that generates a steering assist force by an electric motor. More particularly, the present invention relates to a configuration of electric circuit of the electric power steering apparatus.

BACKGROUND ART

The electric power steering apparatus is a machine that operates the motor for generating the steering assist force according to a steering torque applied by a driver. In recent years, the demand for electric power steering apparatuses for large-size automobiles has increased rapidly. Such a large-size automobile requires an increased steering assist force so that a larger amount of electric power must be supplied to the motor. In some cases, however, a battery alone is unable to fully meet such a large power demand. In this connection, an arrangement has been proposed wherein an auxiliary power supply is provided in addition to the battery such that the normal power demand is met by the battery alone but when a larger amount of electric power is required, the electric power is supplied by both the battery and the auxiliary power supply connected in series (see, for example, Japanese Unexamined Patent Publication No. 2005-287222 (FIG. 1)).

The following configuration is commonly contemplated as the electric circuit of the above-described electric power steering apparatus that uses the auxiliary power supply as required. An electrical conduction path for supplying electric power from a source consisting of the series-connected battery and auxiliary power supply is provided as an independent system from an electrical conduction path for supplying the electric power from the battery alone. The two conduction paths are joined together at some midpoint and led to a motor driving circuit. Each of the conduction paths has a switching device such as a MOS-FET interposed therein. The two switching devices are so controlled as to be turned on alternately.

However, the following problem is encountered if a short-circuit fault (source-drain short circuit of the MOS-FET, for example) occurs in the switching device interposed in the conduction path for supplying the electric power from the battery alone. When a high-voltage power is supplied from the series-connected sources, a current induced by the voltage of the auxiliary power supply is reversed upstream from the junction of the conduction paths. The current flows in a closed circuit powered by the auxiliary power supply and including the two on-state switching devices (one of which is short-circuited). Therefore, the supply of high-voltage power is disabled while wasteful discharge is performed due to continuation of current-flowing. Subsequently when the power supply is returned to a normal mode relying on the battery alone, the fact of the failure is hard to be detected because the damaged switching device is substantially in the same state as the normal on-state.

DISCLOSURE OF THE INVENTION

In view of the above, an object of the present invention is to offer an electric power steering apparatus adapted for quick detection of the short-circuit fault of the switching device.

In accordance with the present invention, an electric power steering apparatus for generating a steering assist force by a motor, comprises: (a) a battery for supplying an electric power to the motor; (b) an auxiliary power supply connected in series with the battery and capable of supplying an electric power to the motor; (c) a charge circuit powered by the battery and serving to charge the auxiliary power supply; (d) a motor driving circuit for driving the motor; (e) a first switching device interposed in a first electrical conduction path for conducting a voltage of the battery to the motor driving circuit; (f) a second switching device interposed in a second electrical conduction path at a place upstream of a junction of the first and second electrical conduction paths, the second electrical conduction path serving to conduct a voltage of the series-connected battery and auxiliary power supply to the motor driving circuit and joining the first electrical conduction path at a place downstream of the first switching device; (g) a voltage detector for detecting a potential difference across at least one of the first switching device and the second switching device; and (h) a control circuit for controlling the first switching device and the second switching device in response to a required steering assist force to thereby turn off either one of the first and second switching devices and turn on the other switching device, the control circuit issuing a failure signal upon determination that the one switching device is damaged in a case where the auxiliary power supply has a voltage equal to or more than a given value and a potential difference across the one switching device is equal to or less than a predetermined value when the other switching device is on.

In the electric power steering apparatus arranged as described above, the control circuit compares the potential difference across the one switching device with the predetermined value in the case where the auxiliary power supply has a voltage equal to or more than the given value and the other switching device is on. When said other switching device is on, said one switching device is essentially turned off and hence, the voltage (terminal-to-terminal voltage) of the auxiliary power supply should be detected as the above potential difference. In the event of the short-circuit fault, however, the above potential difference is equal to or less than the predetermined value (close to zero). In the case where the above potential difference is equal to or less than the predetermined value, the control circuit determines that the one switching device is damaged and produces the failure signal.

According to such an electric power steering apparatus, the short-circuit fault of the switching device, which heretofore has been hard to detect, can be quickly detected by detecting the event that the potential difference across the switching device is equal to or less than the predetermined value under predetermined conditions.

It is preferred in the above electric power steering apparatus that the control circuit deactivates the charge circuit when determining that the one switching device is damaged.

When the one switching device suffers the short-circuit fault, the other switching device is turned on so that discharge current flows through the closed circuit powered by the auxiliary power supply and including the two switching devices. However, an unwanted charging operation following the failure detection can be obviated by deactivating the charge circuit.

The above electric power steering apparatus may also have a configuration wherein the control circuit continues to provide control for steering assist even when determining that the one switching device is damaged.

In this case, the motor can be driven by supplying the voltage from the battery to the motor driving circuit via the one or the other switching device. It is therefore possible to obviate a disadvantage that the detection of failure directly leads to the loss of steering assist force.

BEST MODE FOR CARRYING OUT THE INVENTION

Figure 1:
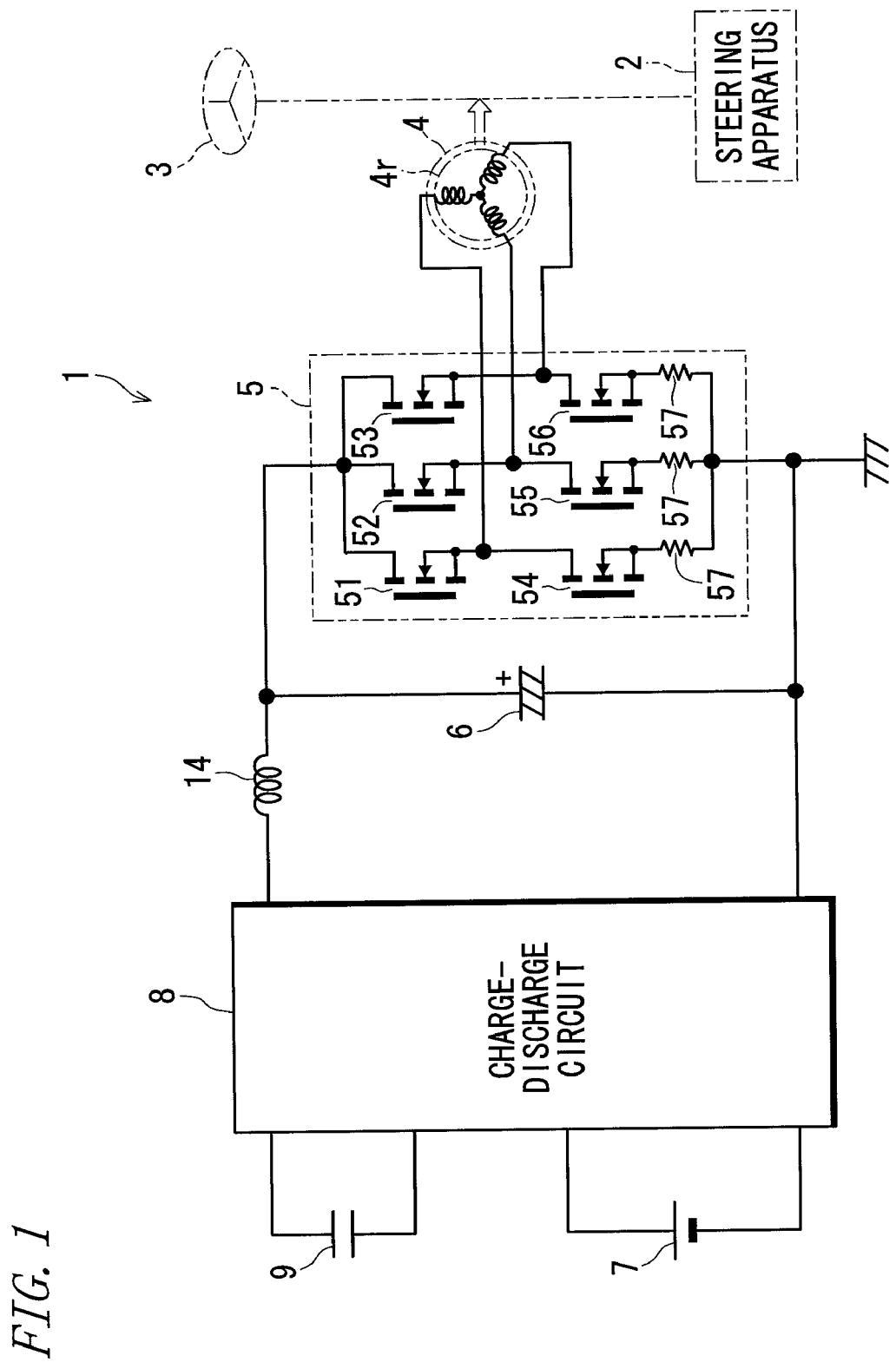
FIG. 1 is a circuit diagram schematically showing a general structure and principally showing electric circuitry of an electric power steering apparatus according to one embodiment of the present invention, or particularly showing a main circuit (except for control circuit) thereof.

FIG. 1 is a circuit diagram schematically showing a general structure and principally showing electric circuitry of an electric power steering apparatus 1 according to one embodiment of the present invention. FIG. 1 is the circuit diagram particularly showing a main circuit (except for control circuit). Referring to the figure, a steering apparatus 2 is driven by a steering torque applied to a steering wheel 3 by a driver and a steering assist force generated by an electric motor 4. Reduction gears (not shown) are employed for power transmission from a rotor 4r of the motor 4 to the steering apparatus 2. The motor 4 is a three-phase brushless motor which is driven by a motor driving circuit 5. The motor driving circuit 5 has a configuration wherein MOS-FETs 51 to 56 and resistors 57 constituting a three-phase bridge circuit are connected as shown in the figure. The motor driving circuit 5 is connected in parallel with a smoothing electrolytic capacitor 6. Electric power from a battery 7 is supplied to the motor driving circuit 5 via a charge-discharge circuit 8 and a reactor 14.

An auxiliary power supply 9 is provided independently from the above battery 7 and is connected to the charge-discharge circuit 8. The auxiliary power supply 9 comprises an electric double-layer capacitor or lithium-ion battery.

Figure 2:
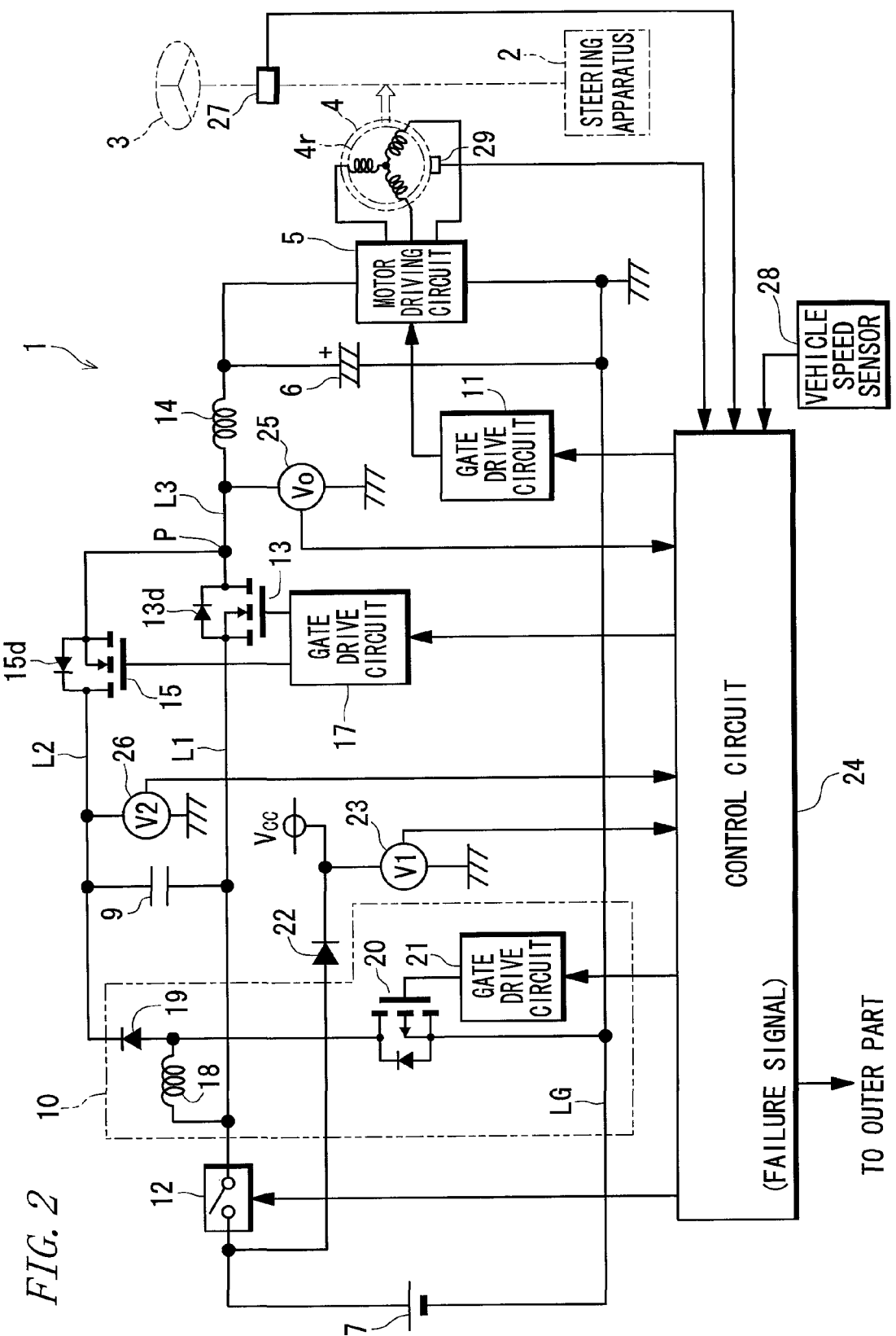
FIG. 2 is a circuit diagram showing, in addition to the components in FIG. 1, a specific configuration of a charge-discharge circuit, control circuit elements and circuit connections.

FIG. 2 is a circuit diagram showing, in addition to the components in FIG. 1, a specific configuration of the charge-discharge circuit 8, control circuit elements and circuit connections. Referring to the figure, the MOS-FETs 51 to 56 in the motor driving circuit 5 (FIG. 1) are switched by a gate drive circuit 11 (for example, FET driver, hereinafter referred to the same). A voltage obtained by boosting a control source voltage Vcc in a booster circuit (not shown) is applied to the gate drive circuit 11 and another gate drive circuit 17 to be described hereinlater.

The voltage of the battery 7 is conducted to the motor driving circuit 5 and the motor 4 via electrical conduction paths L1 and L3 in which a relay contact 12, a MOS-FET 13 and the reactor 14 are interposed. The MOS-FET 13 is an N-channel device that is connected in a manner such that its source is located on a side of the battery 7 and its drain is located on a side of the motor driving circuit 5. A parasitic diode 13d is configured to pass current in the forward direction when the battery 7 supplies the electric power to the motor 4. A positive terminal of the battery 7 is connected to the electrical conduction path L1 via the relay contact 12 as an on-off controllable switch.

The auxiliary power supply 9 is disposed between the electrical conduction path L1 and another electrical conduction path L2. The conduction path L2 on a high-potential side of the auxiliary power supply 9 extends through a MOS-FET 15 to join the conduction path L1 at a place downstream of the MOS-FET 13 and is connected to the conduction path L3. As seen from a junction P, the MOS-FET 15 is located on an upstream side. An arrangement is made such that if both the MOS-FETs 13 and 15 are on, they can form a closed circuit including the auxiliary power supply 9. The MOS-FET 15 is an N-channel device connected in a manner such that its source is located on a side of the motor driving circuit 5 and its drain is located on a side of the auxiliary power supply 9. A parasitic diode 15d is configured to pass current in the reverse direction when the auxiliary power supply 9 supplies the electric power to the motor 4.

The MOS-FETs 13 and 15 are driven by the gate drive circuit 17 in a manner to be alternately turned on.

On the other hand, an anode of a diode 19 is connected to the conduction path L1 via a reactor 18. A cathode of the diode 19 is connected to the conduction path L2 on the high-potential side of the auxiliary power supply 9. A P-channel MOS-FET 20 is interposed between the anode of the diode 19 and an electrical conduction path to ground LG. The MOS-FET 20 is driven by a gate drive circuit 21.

The battery 7 supplies the control source voltage Vcc via a diode 22. A voltage detector 23 is connected to a cathode of the diode 22. The voltage detector 23 detects a voltage V1 issued from the battery 7 on an upstream side of the MOS-FET 13 and sends a detection signal to a control circuit 24. On the other hand, the conduction path L3 is also connected with a voltage detector 25. The voltage detector 25 detects a voltage Vo, applied to the motor driving circuit 5, on a downstream side of the MOS-FET 13 and sends a detection signal to the control circuit 24. It is noted here that the voltage V1 is equal to a voltage applied to the source of the MOS-FET 13 and the voltage Vo is equal to a voltage applied to the drain of the MOS-FET 13. The two voltage detectors 23 and 25 cooperate with the control circuit 24 to detect a potential difference between the opposite terminals (source, drain) of the MOS-FET 13, thus constituting a voltage detection device.

On the other hand, the conduction path L2 is connected with a voltage detector 26. The voltage detector 26 detects a voltage V2 of the conduction path L2 or the voltage supplied by the battery 7 and the auxiliary power supply 9 connected in series. The voltage detector 26 detects the voltage V2 at a place upstream of the MOS-FET 15 and sends a detection signal to the control circuit 24. The above-described voltage detector 25 detects the voltage Vo, applied to the motor driving circuit 5, on a downstream side of the MOS-FET 15 and sends the detection signal to the control circuit 24. It is noted here that the voltage V2 is equal to a voltage applied to the drain of the MOS-FET 15 and the voltage Vo is equal to a voltage applied to the source of the MOS-FET 15. The two voltage detectors 26 and 25 cooperate with the control circuit 24 to detect a potential difference between the opposite terminals (source, drain) of the MOS-FET 15, thus constituting a voltage detection device.

The above-described MOS-FET 13, MOS-FET 15, gate drive circuit 17, reactance 18, diode 19, MOS-FET 20 and gate drive circuit 21 constitute the charge-discharge circuit 8 shown in FIG. 1. Also, the reactance 18, diode 19, MOS-FET 20 and gate drive circuit 21 constitute a charge circuit 10 that is powered by the battery 7 to charge the auxiliary power supply 9.

The above-described gate drive circuits 11, 17, 21 and the relay contact 12 operate in response to command signals from the control circuit 24 including a microcomputer. Inputted to the control circuit 24 is an output signal from a torque sensor 27 for detecting a steering torque applied to the steering wheel 3. Further, an output signal from a vehicle speed sensor 28 for detecting a vehicle speed is also inputted to the control circuit 24. The motor 4 is provided with an angle sensor 29 for detecting a rotational angular position of the rotor 4r. An output signal from the angle sensor is inputted to the control circuit 24.

While the electric power steering apparatus 1 of the above construction operates normally, the relay contact 12 is placed in the on-state (closed) by the command signal from the control circuit 24. Hence, the voltage of the battery 7 is applied to the conduction path L1. Based on the steering torque and the vehicle speed, the control circuit 24 estimates an electric power required for generating a required steering assist force and compares the estimated value with a reference value. In a case where the required electric power is equal to or less than the reference value, the control circuit 24 issues a command signal for turning on the MOS-FET 13 and turning off the MOS-FET 15 so that the voltage of the battery 7 is conducted to the motor driving circuit 5 via the relay contact 12, MOS-FET 13 and reactor 14.

Based on a steering torque signal sent from the torque sensor 27, a vehicle speed signal sent from the vehicle speed sensor 28 and a rotor angular-position signal sent from the angle sensor 29, the control circuit 24 operates the motor driving circuit 5 via the gate drive circuit 11, thereby driving the motor 4 to generate a proper steering assist force.

In this case, an on-resistance of the N-channel MOS-FET 13 (for example, approximately 1 mΩ) is much smaller than a forward resistance of the parasitic diode 13d and hence, the most of the current flowing from the battery 7 toward the motor driving circuit 5 passes through the source and drain thereof whereas a minor amount of current flows into the parasitic diode 13d.

On the other hand, when the MOS-FET 20 is on, the current from the battery 7 flows through the relay contact 12, the reactor 18 and the MOS-FET 20. If the MOS-FET 20 in this state is turned off, a reverse high-voltage is generated in the reactor 18 to thereby interfere with flux reversal caused by the current cutoff, thereby charging the auxiliary power supply 9 via the diode 19. Thus, the auxiliary power supply 9 can be charged by repeatedly turning on and off the MOS-FET 20. The control circuit 24 monitors the voltage (V2-V1) of the auxiliary power supply 9 such that if the voltage is below a given value, the auxiliary power supply 9 is charged by turning on and off the MOS-FET 20 via the gate drive circuit 21. The charging operation is performed at the time when, for example, the torque sensor 27 is not detecting the steering torque.

In a case where the required electric power exceeds the reference value or where the battery 7 alone cannot provide the required electric power, the control circuit 24 turns off the MOS-FET 13 and turns on the MOS-FET 15. As a result, an output voltage from the battery 7 and the auxiliary power supply 9 connected in series with each other is supplied to the motor driving circuit 5. Thus, a high power over the maximum output power from the battery 7 alone can be supplied to the motor driving circuit 5. At this time, the cathode of the parasitic diode 13d of the MOS-FET 13 has higher potential than the anode thereof. Namely, the parasitic diode 13d is subjected to the reverse voltage, thus preventing the auxiliary power supply 9 from producing the current flowing into the conduction path L1.

Figure 3:
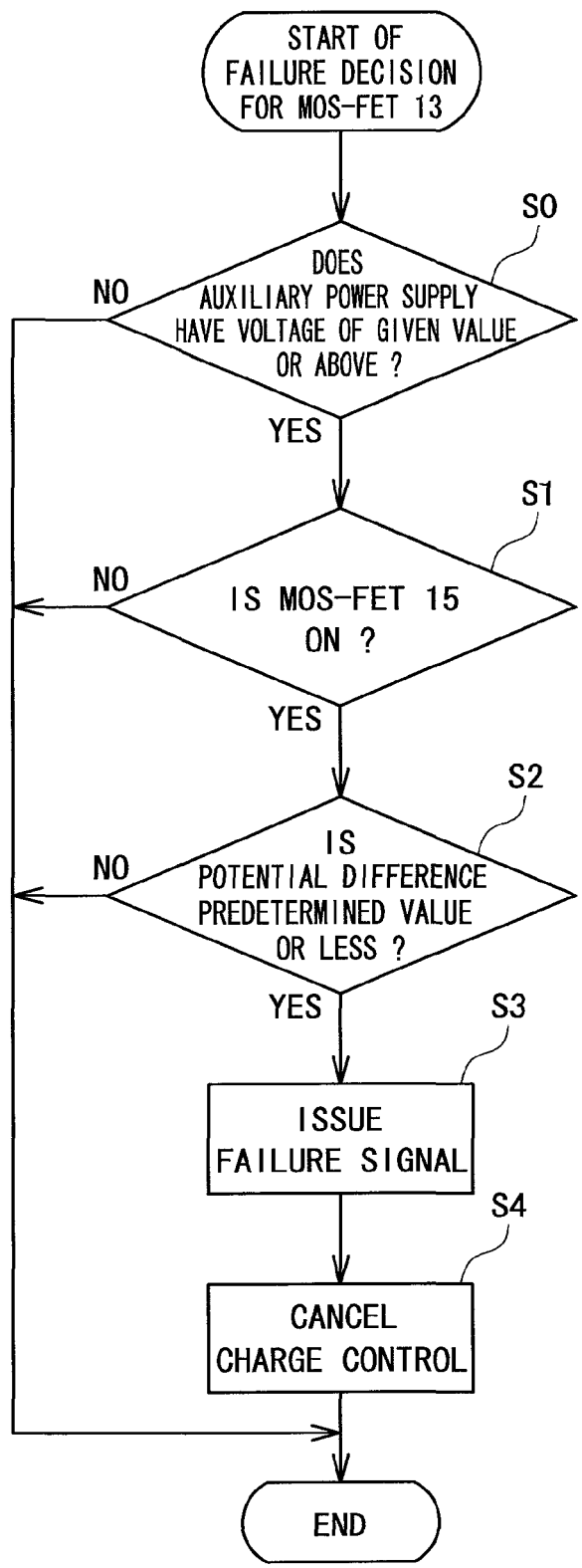
FIG. 3 is a flow chart showing the steps of failure decision.

Next, a failure decision for the MOS-FET 13 executed by the control circuit 24 is described with reference to a flow chart of FIG. 3. A process illustrated by the flow chart is repeated in short cycles. First in Step S0, the control circuit 24 determines whether or not the auxiliary power supply 9 has a voltage of a given value or above. The given value means a voltage value as a criterion for determining whether or not the auxiliary power supply 9 is ready for supplying the electric power to the motor 4. A voltage less than the given value means that the auxiliary power supply 9 is already almost discharged or is unable to charge normally. If the voltage is less than the given value, therefore, the operation does not proceed to the next step but ends here. On the other hand, if the voltage is equal to or more than the given value, the auxiliary power supply 9 is capable of supplying the electric power through electrical discharge. Hence, the next step S1 is performed.

In the subsequent Step S1, the control circuit 24 determines whether the MOS-FET 15 is in the on-state or not, namely whether the auxiliary power supply 9 is discharging or not. If the MOS-FET 15 is in the off-state, the operation does not proceed to the next step but ends here. If the MOS-FET 15 is on, the operation proceeds to Step S2 to determine whether or not a potential difference $\Delta V(=Vo-V1)$ between the voltage Vo detected by the voltage detector 25 and the voltage V1 detected by the voltage detector 23 is equal to or less than a predetermined value.

It is noted here that when the MOS-FET 15 is on, the MOS-FET 13 should be off if it is operating normally. In the parasitic diode 13d, the cathode has a higher potential than the anode and hence, the potential of the conduction path L3 does not affect the conduction path L1. Accordingly, the potential difference $\Delta V$ is a value obtained by subtracting the voltage of the battery 7 from the voltage of the conduction path L2 (or the conduction path L3) relative to the conduction path to ground LG. Namely, the potential difference $\Delta V$ corresponds to a terminal-to-terminal voltage of the auxiliary power supply 9, and the voltage is above the predetermined value (at least 1V, for example). Therefore, it is 'NO' in Step S2 and the operation ends here.

On the other hand, in a case where the MOS-FET 13 suffers a source-drain short circuit fault, the voltages Vo and V1 are substantially equal to each other and hence, the potential difference $\Delta V$ is equal to or less than the predetermined value. The potential difference $\Delta V$ equal to or less than the predetermined value indicates that the MOS-FET 13 suffers the short-circuit fault. Hence, the control circuit 24 issues a failure signal indicating that the MOS-FET 13 is damaged (Step S3). This failure signal is indicated by a pilot lamp in an automobile instrument panel, for example. Further, a warning tone may be generated as required. In this manner, the driver can be informed of the short-circuit fault of the MOS-FET 13.

As described above, the short-circuit fault of the MOS-FET 13, which heretofore has been hard to detect, can be quickly detected by detecting the event that the difference between the potentials detected by the voltage detectors 23 and 25 under the predetermined conditions in Steps S1 and S2 is equal to or less than the predetermined value.

After the output of the failure signal, the control circuit 24 maintains the on-state of the relay contact so as to continue to provide assist control (the control for providing steering assist) for the motor driving circuit 5. This permits the battery 7 to apply the voltage to the motor driving circuit 5 by way of the damaged MOS-FET 13, thereby driving the motor 4. It is therefore possible to obviate a disadvantage that the detection of the short-circuit fault directly leads to the loss of steering assist force.

Upon detection of failure, the control circuit 24 cancels the subsequent charge control (Step S4). Thus, the MOS-FET 20 of the charge circuit 10 (FIG. 2) is held in the off-state so that the charge of the auxiliary power supply 9 is not performed anew. If the MOS-FET 15 is turned on during the short-circuit fault of the MOS-FET 13, the auxiliary power supply 9 is quickly discharged through the two MOS-FETs 13 and 15.

However, wasteful charging following the failure detection can be prevented by disabling another charging operation.

Figure 4:
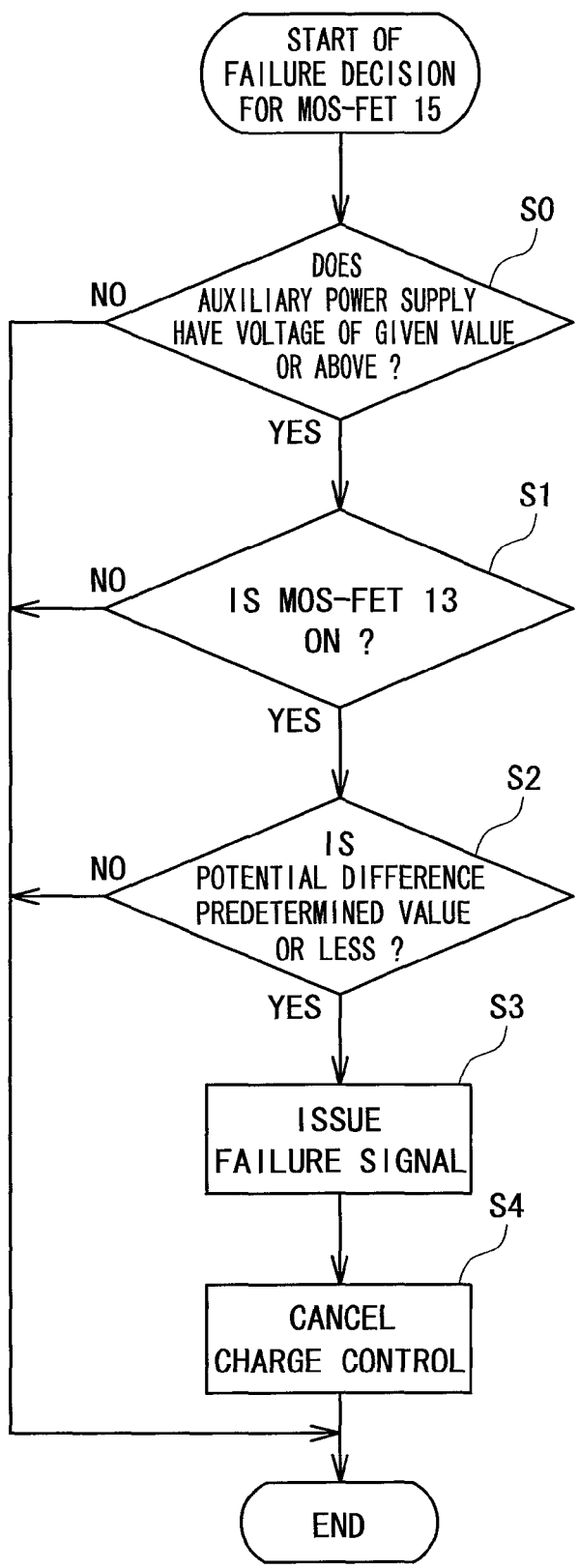
FIG. 4 is a flow chart showing the steps of a failure decision.

Similarly, a failure decision for the MOS-FET 15 executed by the control circuit 24 is described with reference to a flow chart of FIG. 4. A process illustrated by the flow chart is repeated in short cycles. First in Step S0, the control circuit 24 determines whether or not the auxiliary power supply 9 has a voltage of a given value or above. If the voltage is less than the given value, the operation does not proceed to the next step but ends here. If the voltage is equal to or more than the given value, on the other hand, the subsequent step S1 is performed.

In the subsequent Step S1, the control circuit 24 determines whether the MOS-FET 13 is in the on-state or not, namely whether the electric power is supplied only from the battery 7 or not. If the MOS-FET 13 is in the off-state, the operation does not proceed to the next step but ends here. If the MOS-FET 13 is on, the operation proceeds to Step S2 to determine whether or not a potential difference $\Delta V(=V2-Vo)$ between the voltage Vo detected by the voltage detector 25 and the voltage V2 detected by the voltage detector 26 is equal to or less than a predetermined value.

It is noted here that when the MOS-FET 13 is on, the MOS-FET 15 should be off if it is operating normally. In the parasitic diode 15d, the cathode has a higher potential than the anode and hence, the potential of the conduction path L2 does not affect the conduction path L3. Accordingly, the potential difference $\Delta V$ is a value obtained by subtracting the voltage of the battery 7 from the voltage of the conduction path L2 relative to the conduction path to ground LG. Namely, the potential difference $\Delta V$ corresponds to the terminal-to-terminal voltage of the auxiliary power supply 9, and the voltage is above the predetermined value (at least 1V, for example). Therefore, it is 'NO' in Step S2 and the operation flow ends here.

On the other hand, in a case where the MOS-FET 15 suffers a source-drain short-circuit fault, the voltages Vo and V2 are substantially equal to each other and hence, the potential difference $\Delta V$ is equal to or less than the predetermined value. The potential difference $\Delta V$ equal to or less than the predetermined value indicates that the MOS-FET 15 suffers the short-circuit fault. Hence, the control circuit 24 issues a failure signal indicating that the MOS-FET 15 is damaged (Step S3). This failure signal is indicated by a pilot lamp in the automobile instrument panel, for example. Further, the warning tone may be generated as required. In this manner, the driver can be informed of the short-circuit fault of the MOS-FET 15.

As described above, the short-circuit fault of the MOS-FET 15, which heretofore has been hard to detect, can be quickly detected by detecting the event that the difference between the potentials detected by the voltage detectors 26 and 25 under the predetermined conditions in Steps S1 and S2 is equal to or less than the predetermined value.

After the output of the failure signal, the control circuit 24 maintains the on-state of the relay contact 12 so as to continue to provide the assist control (the control for providing steering assist) for the motor driving circuit 5. This permits the battery 7 to apply the voltage to the motor driving circuit 5 via the on-state MOS-FET 13 thereby driving the motor 4. It is therefore possible to obviate the disadvantage that the detection of short-circuit fault directly leads to the loss of steering assist force.

Upon detection of failure, the control circuit 24 cancels the subsequent charge control (Step S4). Thus, the MOS-FET 20 of the charge circuit 10 (FIG. 2) is held in the off-state so that the charge of the auxiliary power supply 9 is not performed anew. If the MOS-FET 13 is turned on during the short-circuit fault of the MOS-FET 15, the auxiliary power supply 9 is quickly discharged through the two MOS-FETs 15 and 13. However, the wasteful charging following the failure detection can be prevented by disabling another charging operation.

It is noted that the connection positions of the two voltage detectors 23 and 25 according to the above embodiment are a mere illustrative example. What is required is to detect voltages at the opposite terminals (source, drain) of each of the MOS-FETs 13 and 15. However, the connection position of the voltage detector 23, shown in FIG. 2, is of significance in that the line for extracting the control source voltage Vcc from the battery 7 can be utilized.

While all the switching devices (13, 15 and 20) of the foregoing embodiment are MOS-FETs, other semiconductor switching devices may also be used.

When determining whether or not the auxiliary power supply 9 is used for supplying the electric power to the motor 4, the control circuit 24 of the above embodiment takes the procedure of estimating the amount of electric power required for generating the required steering assist force, and comparing the estimated value with the reference value. However, the determination may be made by other methods. For instance, the current supplied to the motor driving circuit 5 is varied by the assist control in response to the required steering assist force, the assist control provided by the control circuit 24, gate drive circuit 11 and motor driving circuit 5. Therefore, the following method may be adopted. The voltage of the battery 7 and the current supplied to the motor driving circuit 5 are practically detected so as to determine the present input value by multiplying these detected values. If this present input value is equal to or less than the maximum power supplied by the battery 7 alone, the electric power is supplied by the battery 7 alone. If the present input value exceeds the maximum output of the battery, the electric power is supplied by the source consisting of the series-connected battery 7 and auxiliary power supply 9.

The invention claimed is:

1. An electric power steering apparatus for generating a steering assist force by a motor, comprising:
    a battery for supplying an electric power to the motor;
    an auxiliary power supply connected in series with the battery and capable of supplying an electric power to the motor;
    a charge circuit powered by the battery and serving to charge the auxiliary power supply;
    a motor driving circuit for driving the motor;
    a first switching device interposed in a first electrical conduction path for conducting a voltage of the battery to the motor driving circuit;
    a second switching device interposed in a second electrical conduction path at a place upstream of a junction of the first and second electrical conduction paths, the second electrical conduction path serving to conduct a voltage of the series-connected battery and auxiliary power supply to the motor driving circuit and joining the first electrical conduction path at a place downstream of the first switching device;
    a voltage detector for detecting a potential difference across at least one of the first switching device and the second switching device; and
    a control circuit for controlling the first switching device and the second switching device in response to a required steering assist force to thereby turn off either one of the first and second switching devices and turn on the other switching device, the control circuit issuing a failure signal upon determination that the one switching device is damaged in a case where the auxiliary power supply has a voltage equal to or more than a given value and a potential difference across the one switching device is equal to or less than a predetermined value when the other switching device is on.

2. The electric power steering apparatus according to claim 1, wherein the control circuit deactivates the charge circuit when the control circuit determines that the one switching device is damaged.

3. The electric power steering apparatus according to claim 1, wherein the control circuit continues to provide control for steering assist even when the control circuit determines that the one switching device is damaged.

* * * * *